UNITED STATES PATENT OFFICE.

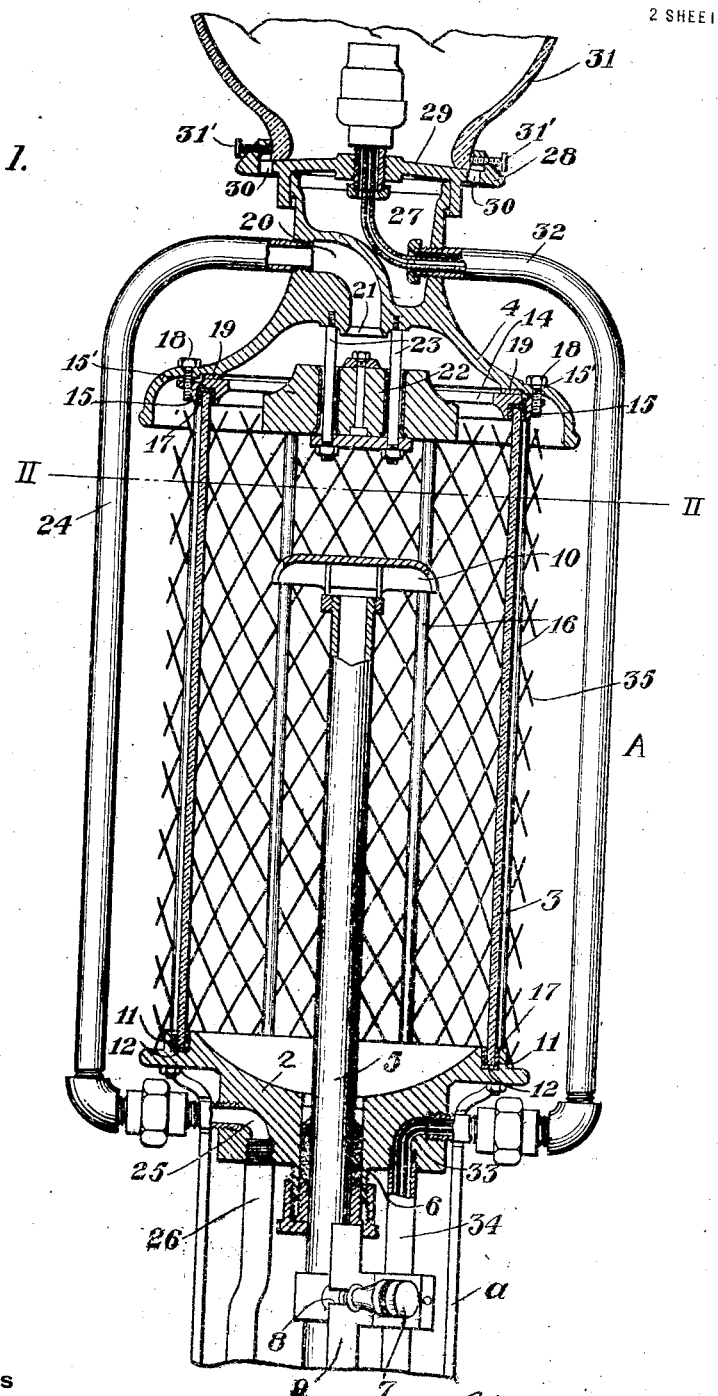

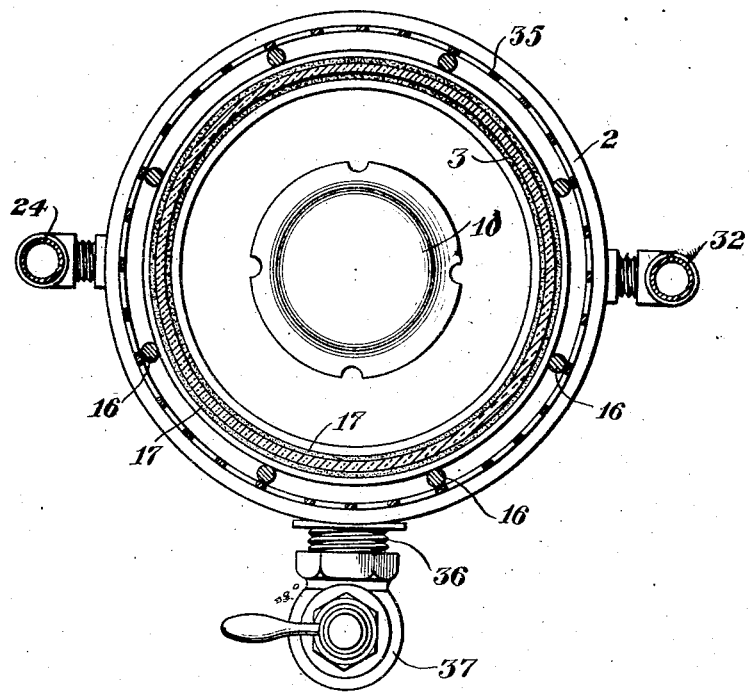
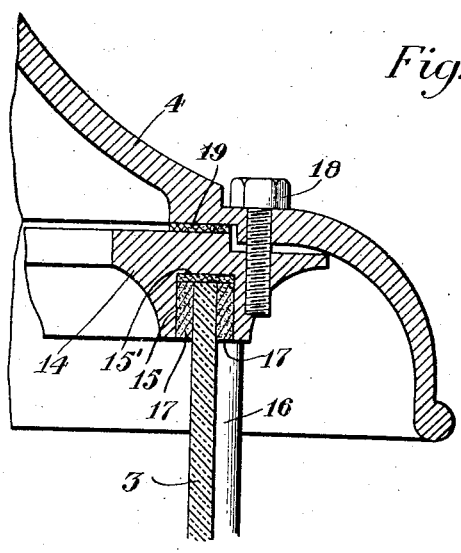

GEORGE W. MacKENZIE, JR., OF BEAVER, AND RAYMOND CROWDER, OF EDGEWOOD, PENNSYLVANIA, ASSIGNORS TO GUARANTEE LIQUID MEASURE COMPANY, OF ROCHESTER, PENNSYLVANIA, A CORPORATION OF DELAWARE.

MEASURING AND DISPENSING PUMP.

1,311,172.  Specification of Letters Patent.  Patented July 29, 1919.

Application filed November 12, 1917. Serial No. 201,685.

*To all whom it may concern:*

Be it known that we, GEORGE W. MAC-KENZIE, Jr., and RAYMOND CROWDER, citizens of the United States, residing at Beaver and Edgewood, respectively, in the counties of Beaver and Allegheny and State of Pennsylvania, have invented certain new and useful Improvements in Measuring and Dispensing Pumps, of which the following is a specification.

Our invention relates to measuring and dispensing pumps for delivering gasolene or other liquids in measured quantities from a secondary or measuring tank connected with a main reservoir or source of supply, and more particularly to the measuring tank and its associated parts.

The improved measuring tank which is the subject of this application is adapted particularly for use on apparatus similar to that described in Patent No. 1,242,831, granted to James A. MacKenzie and George W. MacKenzie, Jr., October 9, 1917, in which the liquid is caused to flow into the transparent secondary or measuring tank by the formation of a partial vacuum therein.

A central vertically adjustable conduit extends upwardly into the secondary or measuring tank and is connected with the storage vessel or source of supply, and suitable air exhausting means is provided and adapted to exhaust the air from the secondary tank when desired. The central conduit is adjustable to predetermined positions only, and when set to a selected position, the air exhausting mechanism is set in motion thereby exhausting the air from the secondary tank and creating a partial vacuum which will cause the liquid to flow into the measuring tank through the adjustable conduit until the air exhausting mechanism is stopped. Appropriate indicia are provided on the transparent measuring tank so that the amount of liquid therein may be readily observed and ascertained. A suitable discharge outlet is also provided in such a position on the tank that all the liquid must flow out therethrough.

The principal object of the present invention is to so construct the transparent secondary or measuring tank wall and its terminal engaging members as to provide an absolute air and liquid tight seal around its edges.
Another object is to provide such a structure that will permit of ready accessibility to its interior without injuring the air tight joints, and to provide for the mounting of the cylindrical tank wall between a lower base and an upper coping by means adapted to facilitate accurate fitting of the parts.

Other objects such as the improved formation of the bottom and top framing castings of such tank, the improved protecting casing, etc., will be more fully brought out in the following specification.

While we have shown and described our invention as pertaining to measuring and dispensing pumps, it will be understood that we do not limit ourselves to this particular use, but that it may be used wherever a tank of this class is desired.

In the drawings:—

Figure 1 is a vertical sectional view of a pump, partly broken away, showing our improved measuring tank and its associated mechanism;

Fig. 2 is a horizontal sectional view thereof on the line II, II, Fig. 1; and Fig. 3 is an enlarged detail view of the upper portion of the tank showing the novel form of joint used.

Referring now particularly to the drawings, the letter $a$ designates the hollow standard of the pump casing. The measuring tank is designated as a whole by the letter A and comprises a cast metal base 2 supported on the standard $a$, a cylindrical transparent casing 3, and a cast metal top member 4.

A conduit 5 extends upwardly through the standard $a$ from a storage vessel (not shown) and passes through a stuffing box 6 into the measuring tank A. Conduit 5 is adapted to be raised or lowered and partially rotated by the handle 7, and to be held in predetermined positions by engaging the handle 7 in slots 8 in bars 9. The upper end of the conduit 5 is preferably provided with a splash coping 10, by which the rising fluid is deflected downwardly into the tank A.

When the handle 7 is thrown out of engagement with the slots 8 the conduit 5 may be raised or lowered to any position desired. Conduit 5 is adapted to be adjusted to different levels to limit the amount of liquid within the tank A. Each slot 8 designates a measuring level and when handle 7 is in place within one of the slots 8 the upper terminal of conduit 5 will be at a corresponding level in the tank A. Liquid is drawn through the conduit 5 by creating a partial vacuum within tank A and when sufficient liquid has entered such tank, atmospheric pressure is established causing all excess liquid above the terminal of the conduit 5 to flow back through the same into the storage vessel from which it has been drawn. The particular means for creating a vacuum and the means for establishing atmospheric pressure, also the storage tank, are not shown in the present application, since any well known means may be used.

The base member 2 of the tank A has a circumferentially arranged slot 11 formed on its upper base to receive the cylindrical transparent casing 3 of the tank A, and such annular slot is of ample width, as shown. A suitable gasket 12 of any well known material, but preferably a fibrous composition, is placed in the slot 11 and the casing 3 is then rested thereon.

A ring member 14 has a slot 15 formed therein of considerably greater width than the thickness of the casing 3. A gasket 15' similar to the gasket 12 therein, is placed between the bottom of annular slot 15 and the top of the casing 3, and suitable tie rods 16 are passed through apertures in the ring 14 and the base 2 and tightened until the gaskets are under a pressure of about 178 lbs. While the gaskets are under this pressure a compond cement, which is preferably composed of litharge and glycerin, is forced into the slots 11 and 15 on each side of the casing 3, as at 17, and when hardened forms an absolute impervious locking bond between the several parts. In this manner base 2, cylinder 3 and ring 14 are fixedly secured together, the wide slots 11 and 15 compensating for any variations in cylinder 3 as to thickness or diameter.

The ring 14 is adapted to be secured to a suitable top casting or cap 4 by screw members or bolts 18, and a gasket 19 is placed between such parts.

The top casting 4 has a cored aperture 20 therein having its inner end terminating at the center of the casting and formed to provide a valve seat 21. A suitable float valve 22 is mounted for free vertical movement on hangers 23 and is adapted to be seated on the valve seat 21, to automatically stop the exhausting of the air should the liquid rise above a certain level. The outer end of the aperture 20 is screw-threaded to receive a conduit 24 which passes downward and is screw-threaded into the outer end of an aperture 25 in the base 2. The inner end of aperture 25 is also screw-threaded to receive a continuation 26 of the conduit 24 which leads to suitable air-exhausting means (not shown). It will thus be seen that expensive fittings and much labor in assembling is eliminated by the utilization of the cored apertures in the base and top.

The top casting is provided with an enlarged aperture or recess 27 which serves as a conduit box. Recess 27 is closed by a cover member 28, adapted to support a lamp, having a sloping bottom 29 and drain holes 30. Said member 28 is centrally apertured to receive a socket for an electric bulb and a globe or shade 31 is adapted to be held on the member 28 by set screws 31'.

An aperture is formed in the side wall of the recess 27 to receive a wire conduit 32.

Base member 2 has an aperture 33 formed therein, the terminal ends of which are enlarged and screw-threaded to receive the conduits 32 and 34. By enlarging the terminal ends of the aperture 33 to receive the outer threaded pipe terminals a continuous smooth internal surface is presented when the conduits are screwed into place.

Arranged around the outer surface of the cylindrical transparent casing 3, and spaced therefrom, is a protecting casing 35 of expanded metal, wire nettting, or other similar material. The protecting casing 35 is provided to prevent breakage of the cylinder 3, which is preferably made of glass, and the space between the walls of the glass cylinder 3 and the protecting casing 35 will permit of a considerable blow without injuring the member 3.

Arranged at the lower extremity of the measuring tank is an outlet conduit 36 having a valve or shut-off cock 37 of any well known construction secured thereto.

The operation of the pump as a whole will be readily understood by the foregoing description, and the advantages of a measuring tank constructed as described herein will be readily apparent. With the cylindrical glass member 3, mounted in the castings 2 and 4, as herein set forth, these parts become as a single unit when the cement hardens, and cannot be removed without breaking of the cylinder or by cutting away the cement from within the slots 11 and 15. In mounting the glass cylinder 3 in slot 11 of base 2, the plastic cement is laid around both inside and outside of the lower edge of the cylinder, and the cylinder is thus substantially centralized on the base. The same application is made in cementing the upper end of the cylinder in the groove 15 of ring 14, the hollow ring providing access to the interior. A special advantage in this construction is that the top ring thus becomes a part of the cylinder, and compensates for any variations in its thickness or diameter so that ring 14 can then be connected with coping 4 by bolts 18, or adjusted with relation to the coping without danger of breaking the glass cylinder. It will also be noted that the particular form of cement used will not deteriorate by use or be affected by weather, changes in temperature, or by the liquids dispensed through the pump.

Particular attention is also directed to the formation of the cored apertures in the top and base members 4 and 2, respectively. By the use of these apertures, applicant is able to eliminate the use of elbows, nipples and other fittings which are expensive and which require special tools and much labor to assemble in constructions heretofore used and at best did not give as satisfactory a structure as is now obtained.

Having thus described our invention, what we claim is:—

1. In a liquid measuring vessel, a supporting base having an upper surrounding receiving groove for the bottom of a glass casing of materially greater width than the thickness of the casing, a supporting packing gasket on the bottom of the groove, a casing set by its lower edge in the middle portion of said groove against said gasket, a filling of cement between the inner and outer edge portions of the casing and the adjacent walls of the groove, and an upper terminal ring having a lower receiving groove and packing material engaging the upper edge of the casing and provided with a superimposed coping having an air suction conduit.

2. In a liquid measuring vessel, an upper centrally hollow attaching terminal for a glass casing having underneath a surrounding receiving groove for the top of the casing of materially greater width than the thickness of the casing, a packing gasket laid in the top of the groove, a casing set by its upper edge in the middle portion of said groove against said gasket, a filling of cement between the inner and outer edge portions of the casing and the adjacent walls of the groove, a superimposed coping having an air suction conduit, and a lower supporting base having an upper receiving groove and packing material engaging the lower edge of the casing.

3. In combination, a supporting frame, a base thereon having an upper surrounding receiving groove with a packing gasket therein, an upper centrally hollow attaching terminal having underneath a surrounding receiving groove with a packing gasket therein, a glass casing set by its lower and upper edges in the middle portions of said grooves against said gaskets, a filling of cement between the inner and outer bottom and top edge portions of the casing and the adjacent walls of said grooves, supplemental means fixedly connecting the base and attaching terminal, and an upper coping secured upon said terminal provided with an air suction conduit.

4. In combination, a supporting frame, a base thereon having an upper surrounding receiving groove with a packing gasket therein, an upper centrally hollow attaching terminal having underneath a surrounding receiving groove with a packing gasket therein, a glass casing set by its lower and upper edges in the middle portion of said grooves against said gaskets, a filling of cement between the inner and outer bottom and top edge portions of the casing and the adjacent walls of said grooves, a series of rods fixedly connecting the base and attaching terminal, an outer protecting metallic netting, and an upper coping secured upon said terminal provided with an air suction conduit.

5. In combination, a supporting frame, a base thereon having an upper surrounding receiving groove with a packing gasket therein, an upper centrally hollow attaching terminal having underneath a surrounding receiving groove with a packing gasket therein, a glass casing set by its lower and upper edges in the middle portion of said grooves against said gaskets, a filling of cement between the inner and outer bottom and top edge portions of the casing and the adjacent walls of said grooves, a series of rods fixedly connecting the base and attaching terminal, an outer protecting metallic netting, an upper coping secured upon said terminal provided with an air suction conduit and an inner valve seat, and a buoyant float suspended from the coping and provided with a closing valve for said seat.

In testimony whereof we hereunto affix our signatures.

GEORGE W. MACKENZIE, JR.
RAYMOND CROWDER.